(12) United States Patent
Nagasaka et al.

(10) Patent No.: US 11,995,576 B2
(45) Date of Patent: May 28, 2024

(54) VEHICLE ALLOCATION DEVICE, VEHICLE, AND TERMINAL

(71) Applicant: TOYOTA JIDOSHA KABUSHIKI KAISHA, Aichi-ken (JP)

(72) Inventors: Keisuke Nagasaka, Gotemba (JP); Daiki Yokoyama, Gotemba (JP); Hiroshi Oyagi, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 479 days.

(21) Appl. No.: 17/316,721

(22) Filed: May 11, 2021

(65) Prior Publication Data

US 2021/0358306 A1     Nov. 18, 2021

(30) Foreign Application Priority Data

May 13, 2020   (JP) .................................. 2020-084805

(51) Int. Cl.
| | |
|---|---|
| *G06Q 10/02* | (2012.01) |
| *G06F 18/214* | (2023.01) |
| *G06N 20/00* | (2019.01) |
| *G08G 1/00* | (2006.01) |

(52) U.S. Cl.
CPC ........... *G06Q 10/02* (2013.01); *G06F 18/214* (2023.01); *G06N 20/00* (2019.01); *G08G 1/202* (2013.01)

(58) Field of Classification Search
CPC .. G06Q 10/02; G06Q 10/0631; G06F 18/214; G06F 18/2431; G06N 20/00; G06N 3/08; G08G 1/202
See application file for complete search history.

(56) References Cited

U.S. PATENT DOCUMENTS

| | | | |
|---|---|---|---|
| 2019/0039622 A1 | 2/2019 | Kumazaki | |
| 2020/0342419 A1* | 10/2020 | Zatta | ....................... G07C 5/008 |
| 2020/0342420 A1* | 10/2020 | Zatta | ....................... G06Q 50/30 |
| 2021/0142248 A1* | 5/2021 | Balva | ...................... G08G 1/202 |

FOREIGN PATENT DOCUMENTS

| | | | | |
|---|---|---|---|---|
| JP | 201932625 A | 2/2019 | | |
| JP | 2020-009060 A | 1/2020 | | |
| WO | WO-2014040134 A1 * | 3/2014 | ............. | G06Q 10/04 |
| WO | WO-2019203805 A1 * | 10/2019 | | |

* cited by examiner

*Primary Examiner* — Yonel Beaulieu
(74) *Attorney, Agent, or Firm* — HAUPTMAN HAM, LLP

(57) ABSTRACT

A vehicle allocation device allocates a vehicle in response to a vehicle allocation request from a terminal of a user, and includes a vehicle selector configured to, when acquiring the vehicle allocation request, select a vehicle having a relatively large degree of progress in learning of a relation between input and output of a parameter depending on an area to be traveled by the user from a plurality of vehicles learning a relation between input and output of a parameter depending on a predetermined area, and output a vehicle allocation instruction to the selected vehicle.

10 Claims, 10 Drawing Sheets

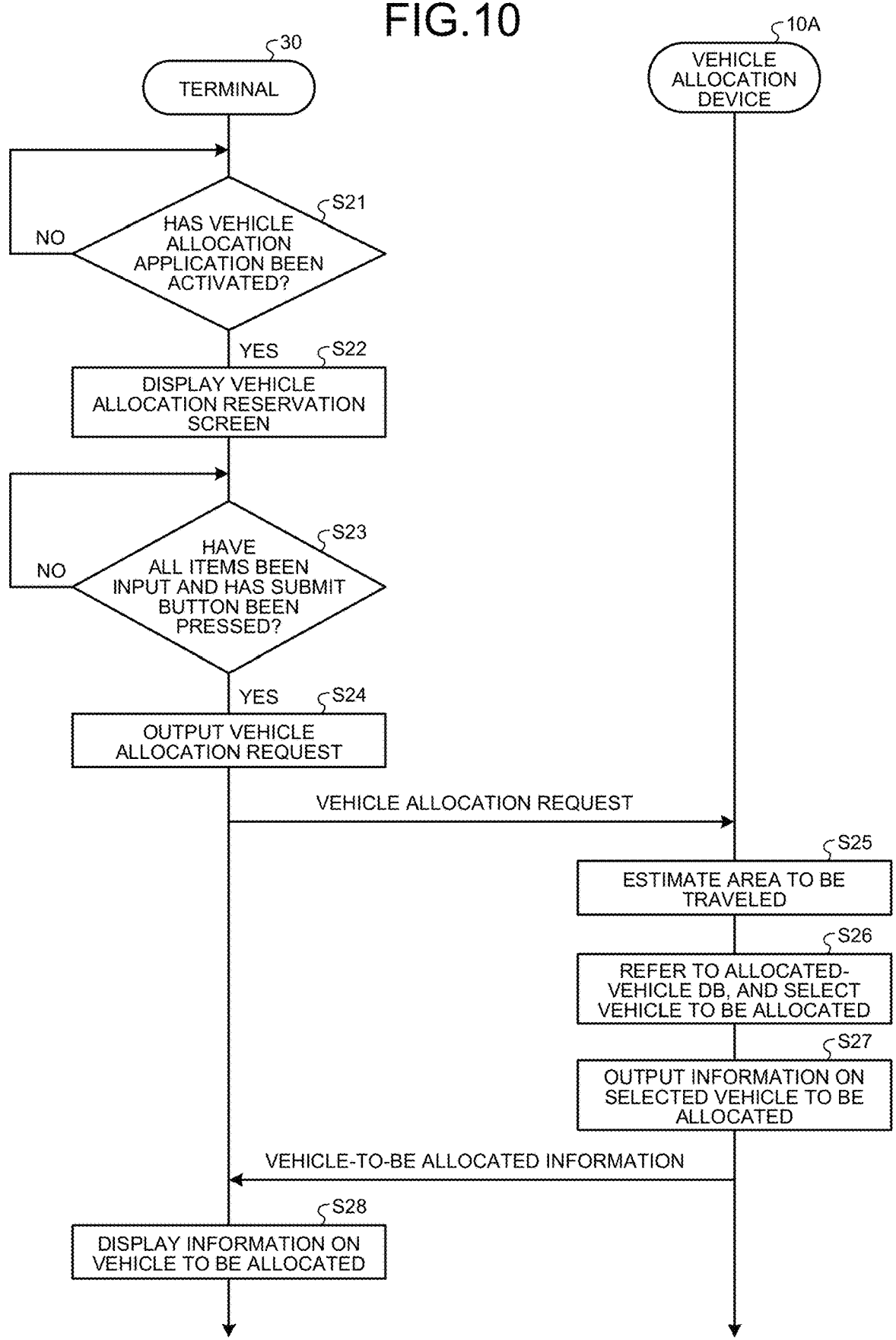

VEHICLE ALLOCATION DEVICE, VEHICLE, AND TERMINAL

CROSS-REFERENCE TO RELATED APPLICATION(S)

The present application claims priority to and incorporates by reference the entire contents of Japanese Patent Application No. 2020-084805 filed in Japan on May 13, 2020.

BACKGROUND

1. Technical Field

The present disclosure relates to a vehicle allocation device, a vehicle, and a terminal.

2. Related Art

JP 2019-032625 A discloses a technique for preferentially allocating a vehicle in order from a vehicle having a low degree of progress in hydraulic control learning in a system for allocating a vehicle having a hydraulic control learning function of a power transmission device.

In a vehicle allocation method disclosed in JP 2019-032625 A, a vehicle having a low degree of progress in learning is preferentially allocated, so that a user has few advantages in use. Thus, there has been a demand for a vehicle allocation method having many advantages in use for a user.

It is desirable to provide a vehicle allocation device, a vehicle, and a terminal capable of improving advantages in use for a user.

SUMMARY

In some embodiments, provided is a vehicle allocation device for allocating a vehicle in response to a vehicle allocation request from a terminal of a user. The vehicle allocation device includes a vehicle selector configured to, when acquiring the vehicle allocation request, select a vehicle having a relatively large degree of progress in learning of a relation between input and output of a parameter depending on an area to be traveled by the user from a plurality of vehicles learning a relation between input and output of a parameter depending on a predetermined area, and output a vehicle allocation instruction to the selected vehicle.

As a result, a vehicle relatively progressing ahead in learning an area to be traveled among vehicles to be allocated is preferentially and easily allocated.

In the vehicle allocation device, the vehicle selector may be configured to select a vehicle having a largest degree of progress in learning of the relation between input and output of the parameter depending on the area to be traveled by the user from the plurality of vehicles, and output the vehicle allocation instruction to the selected vehicle having the largest degree of progress in learning of the relation between input and output of the parameter depending on an area to be traveled by the user.

As a result, a vehicle most progressing ahead in learning an area to be traveled among vehicles to be allocated is preferentially allocated.

The vehicle allocation device may further include an area-to-be-traveled estimator configured to estimate the area to be traveled based on a destination included in the vehicle allocation request.

As a result, the need for a user himself/herself to specify an area to be traveled during vehicle allocation is eliminated, which saves the user efforts.

The vehicle allocation device may further include a learning circuit configured to learn a parameter collected by each of the plurality of vehicles as teacher data.

As a result, a calculation load on the side of a vehicle is reduced by the side of a vehicle allocation device learning teacher data.

In the vehicle allocation device, the vehicle selector may be configured to acquire the degree of progress in learning calculated based on a number of pieces of the teacher data from each vehicle.

As a result, the side of the vehicle allocation device can grasp how much each vehicle has progressed in learning.

In the vehicle allocation device, the parameter may depend on the predetermined area, and includes air temperature, humidity, air pressure, gradient, altitude, engine intake air amount, engine ignition timing, and engine exhaust temperature.

As a result, various parameters depending on a predetermined area can be learned.

In some embodiments, provided is a vehicle to be allocated by a vehicle allocation device in response to a vehicle allocation request from a terminal of a user. The vehicle includes a controller configured to: learn a relation between input and output of a parameter depending on a predetermined area; and acquire a vehicle allocation instruction from the vehicle allocation device when a degree of progress in learning of a relation between input and output of a parameter depending on an area to be traveled by the user is relatively larger than that of another vehicle to be allocated.

As a result, a vehicle relatively progressing ahead in learning an area to be traveled among vehicles to be allocated is preferentially and easily allocated.

In the vehicle, the controller may be configured to acquire the vehicle allocation instruction from the vehicle allocation device when the degree of progress in learning of the relation between input and output of the parameter depending on the area to be traveled by the user is largest as compared to another vehicle to be allocated.

As a result, a vehicle most progressing ahead in learning an area to be traveled among vehicles to be allocated is preferentially allocated.

In the vehicle, the controller may include: a teacher data collector configured to collect teacher data including an input parameter and an output parameter depending on a predetermined area; and a degree-of-progress-in-learning calculator configured to calculate the degree of progress in learning based on a number of pieces of the teacher data, and output the calculated degree of progress in learning to the vehicle allocation device.

As a result, each vehicle can collect teacher data at the same time as calculating a degree of progress in learning, and transmit the degree of progress in learning to the side of the vehicle allocation device.

In the vehicle, the parameter may depend on the predetermined area, and includes air temperature, humidity, air pressure, gradient, altitude, engine intake air amount, engine ignition timing, and engine exhaust temperature.

As a result, various parameters depending on a predetermined area can be learned.

In some embodiments, provided is a terminal that makes a vehicle allocation request to a vehicle allocation device. The terminal includes a vehicle allocation reservation circuit configured to receive a vehicle allocation reservation from a user, and output a vehicle allocation request to the vehicle allocation device based on the received vehicle allocation reservation. The vehicle allocation reservation circuit is configured to acquire information on a vehicle as vehicle-to-be-allocated information by outputting a vehicle allocation request to the vehicle allocation device, the vehicle being selected from a plurality of vehicles learning a relation between input and output of a parameter depending on a predetermined area, the vehicle having a relatively large degree of progress in learning of a relation between input and output of a parameter depending on an area to be traveled by the user.

As a result, a vehicle relatively progressing ahead in learning an area to be traveled among vehicles to be allocated is preferentially and easily allocated.

In the terminal, the vehicle allocation reservation circuit may be configured to acquire the information on the vehicle as the vehicle-to-be-allocated information by outputting the vehicle allocation request to the vehicle allocation device, the vehicle being selected from the plurality of vehicles learning the relation between input and output of the parameter depending on the predetermined area, the vehicle having a largest degree of progress in learning of the relation between input and output of the parameter depending on the area to be traveled by the user.

As a result, a vehicle most progressing ahead in learning an area to be traveled among vehicles to be allocated is preferentially allocated.

In the terminal, the parameter may depend on the predetermined area, and includes air temperature, humidity, air pressure, gradient, altitude, engine intake air amount, engine ignition timing, and engine exhaust temperature.

As a result, various parameters depending on a predetermined area can be learned.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 10 is a flowchart illustrating a flow of a vehicle allocation reservation in the vehicle allocation method executed by the vehicle allocation system according to the second embodiment.

DETAILED DESCRIPTION

A vehicle allocation device, a vehicle, and a terminal according to embodiments of the disclosure will be described with reference to the drawings. Note that components in the following embodiments include those that can be easily replaced by those skilled in the art, or those that are substantially the same.

First Embodiment

Figure 1:
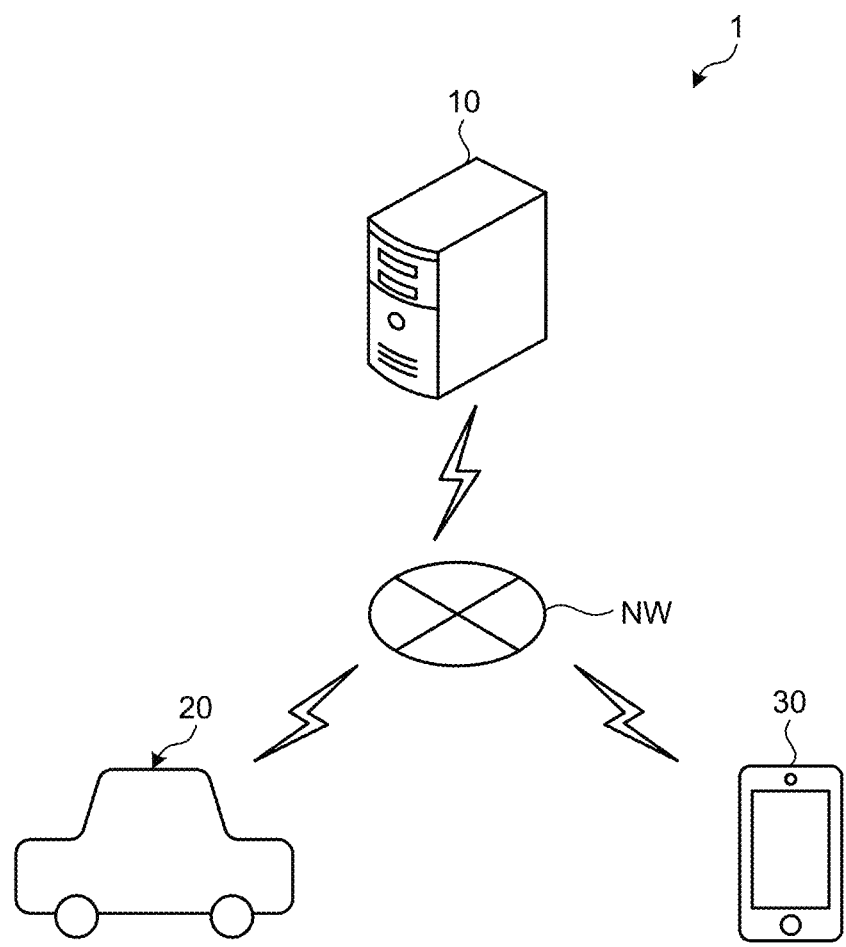
FIG. 1 schematically illustrates a vehicle allocation system including a vehicle allocation device, a vehicle, and a terminal according to a first embodiment.

A vehicle allocation system according to a first embodiment of the disclosure will be described with reference to FIGS. 1 to 6. As illustrated in FIG. 1, a vehicle allocation system 1 according to the embodiment includes a vehicle allocation device 10, a vehicle 20, and a terminal 30. All of the vehicle allocation device 10, the vehicle 20, and the terminal 30 have a communication function, and can communicate with each other through a network NW. The network NW includes, for example, an internet network and a mobile phone network.

Vehicle Allocation Device

The vehicle allocation device 10 allocates the vehicle 20 to a user of the terminal 30 in response to a vehicle allocation request from the terminal 30. The vehicle allocation device 10 is implemented by a general-purpose computer such as a workstation and a personal computer.

Figure 2:
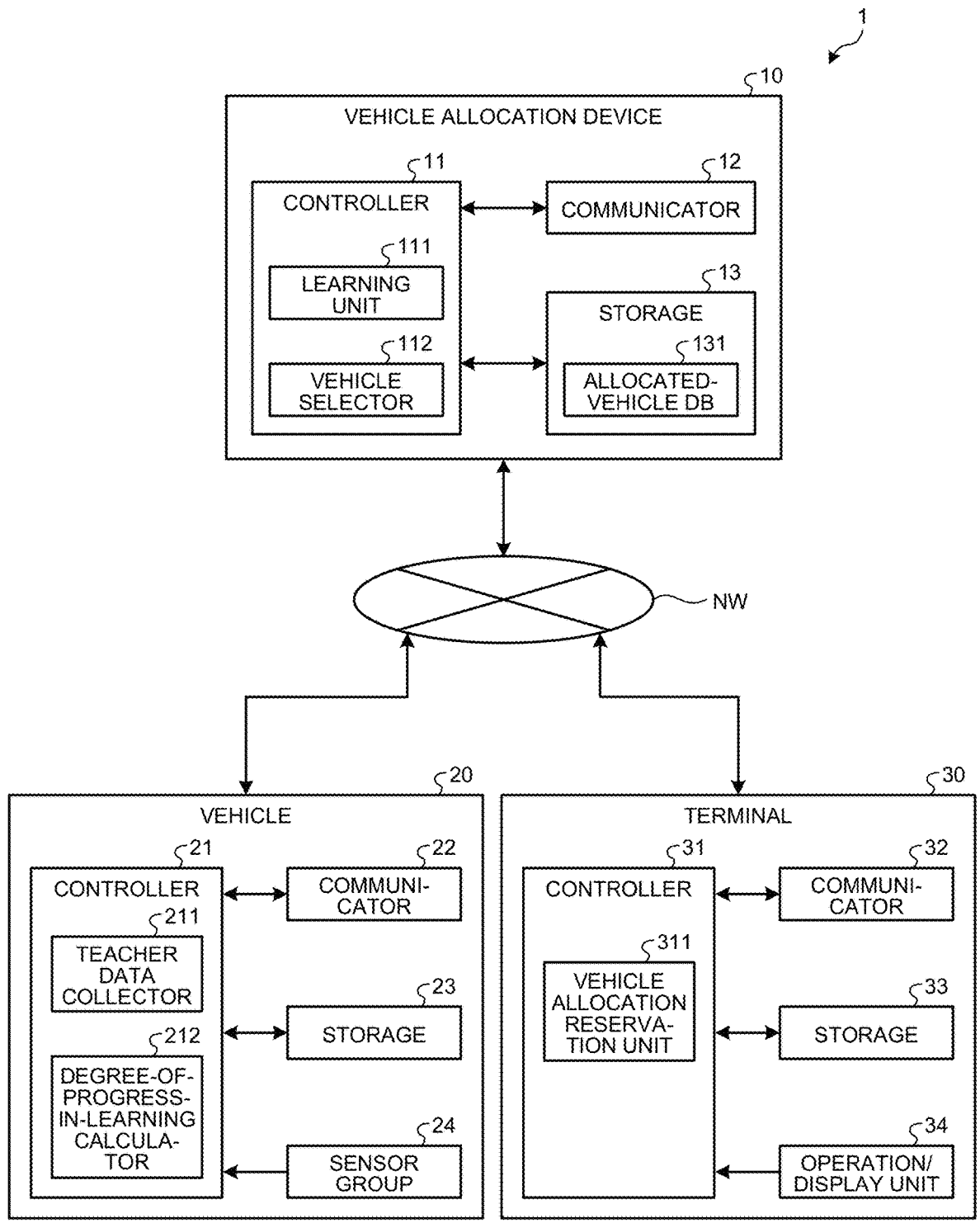
FIG. 2 is a block diagram schematically illustrating each configuration of the vehicle allocation system according to the first embodiment.

As illustrated in FIG. 2, the vehicle allocation device 10 includes a controller 11, a communicator 12, and a storage 13. Specifically, the controller 11 includes a processor and a memory (main storage). The processor includes, for example, a central processing unit (CPU), a digital signal processor (DSP), and a field-programmable gate array (FPGA). The memory includes, for example, a random access memory (RAM) and a read only memory (ROM).

The controller 11 loads a program stored in the storage 13 into a work area of the main storage, and executes the program. The controller 11 implements a function that matches a predetermined purpose by controlling, for example, each component through execution of the program. Specifically, the controller 11 functions as a learning unit (learning circuit) 111 and a vehicle selector 112 through execution of the above-described program.

The learning unit 111 learns teacher data. The learning unit 111 acquires parameters (learning values) collected by each vehicle 20 through the network NW from a plurality of vehicles 20 to be allocated. The parameters depend on the environment of a predetermined area, and includes, for example, air temperature, humidity, air pressure, gradient, altitude, engine intake air amount, engine ignition timing, and engine exhaust temperature. Furthermore, the "environment of a predetermined area" indicates, for example, a pavement condition of a road, the inclination of the road, and the altitude of the road.

Subsequently, the learning unit 111 creates a learned model by performing machine learning using the above-described parameters as teacher data. Then, the learning unit 111 outputs the created learned model to each vehicle 20 through the network NW. A calculation load on the side of the vehicle 20 is reduced by the side of the vehicle allocation device 10 learning teacher data.

A machine learning method in the learning unit 111 is not particularly limited, and supervised learning such as a neural network, a support vector machine, a decision tree, simple Bayes, and a k-nearest neighbor algorithm can be used, for example. Furthermore, semi-supervised learning may be used instead of the supervised learning.

Figure 3:
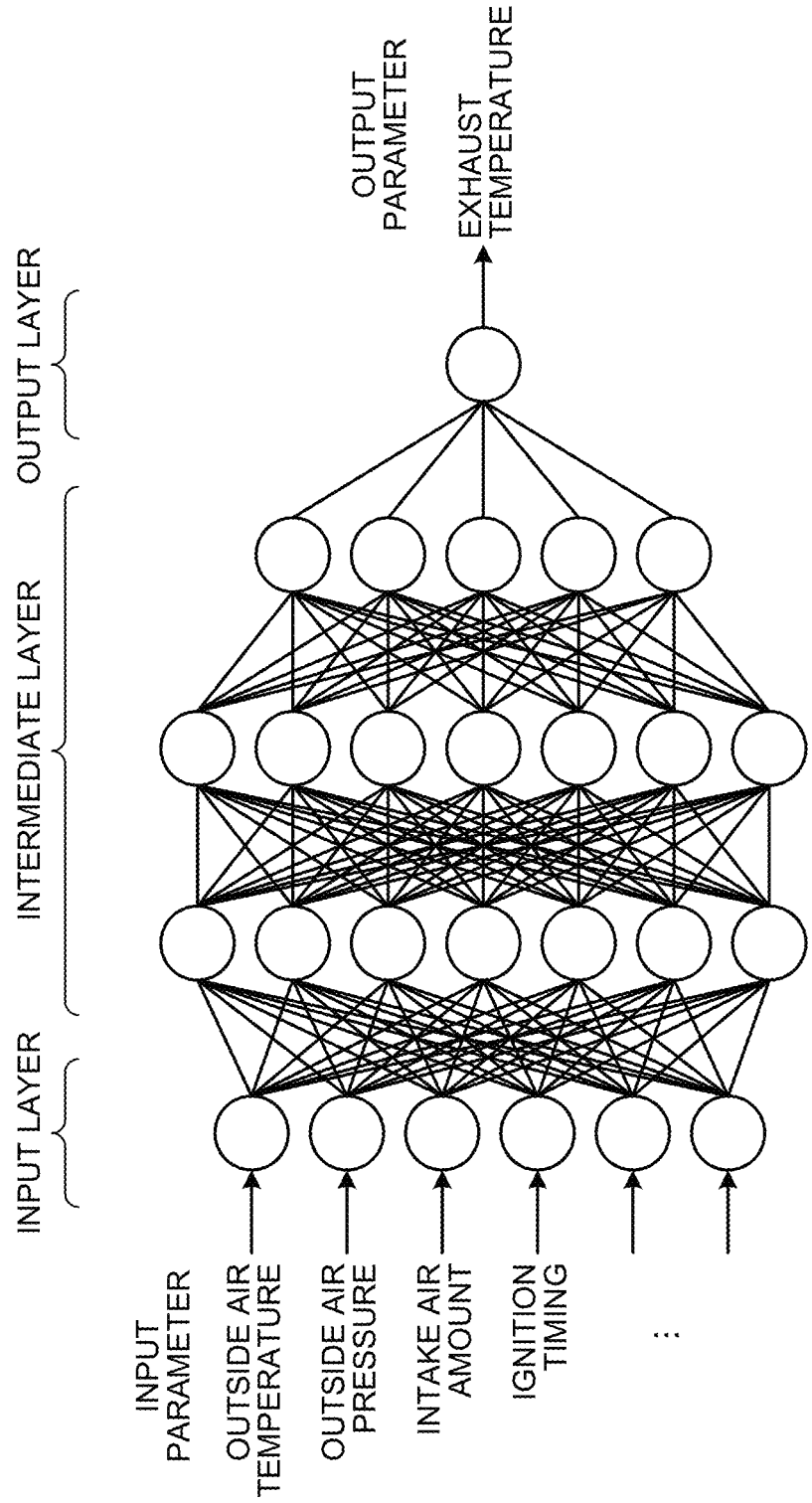
FIG. 3 illustrates one example of a neural network.

Hereinafter, a neural network will be described as one example of a specific machine learning method. As illustrated in FIG. 3, the neural network has an input layer, an intermediate layer, and an output layer. The input layer includes a plurality of nodes. Different input parameters are input to each node. An output from the input layer is input to the intermediate layer. Furthermore, the intermediate layer has a multi-layer structure including a layer composed of a plurality of nodes that receive input from the input layer. An output from the intermediate layer is input to the output layer. The output layer outputs an output parameter. Machine learning using a neural network in which the intermediate layer has a multi-layer structure is called deep learning. The figure illustrates an example in which the input parameter includes "outside air temperature, outside air pressure, intake air amount, and ignition timing", and the output parameter includes "exhaust temperature". The learning unit 111 creates a learned model by learning the relation between these input parameters and the output parameter.

Note that the outside air temperature and the outside air pressure illustrated as the input parameters in FIG. 3 have a value peculiar to the area (value that characterizes the area). Thus, a learned model that estimates the exhaust temperature more adapted to the area can be created by reflecting the outside air temperature and the outside air pressure peculiar to the area in learning.

The vehicle selector 112 selects the vehicle 20 to be allocated to the user of the terminal 30 from the plurality of vehicles 20. When acquiring a vehicle allocation request from the terminal 30 through the network NW, the vehicle selector 112 selects the vehicle 20 having a relatively large (fast) degree of progress in learning of the relation between input and output of parameters depending on an area to be traveled by the user from a plurality of vehicles 20 learning the relation between input and output of parameters depending on a predetermined area.

Figure 4:
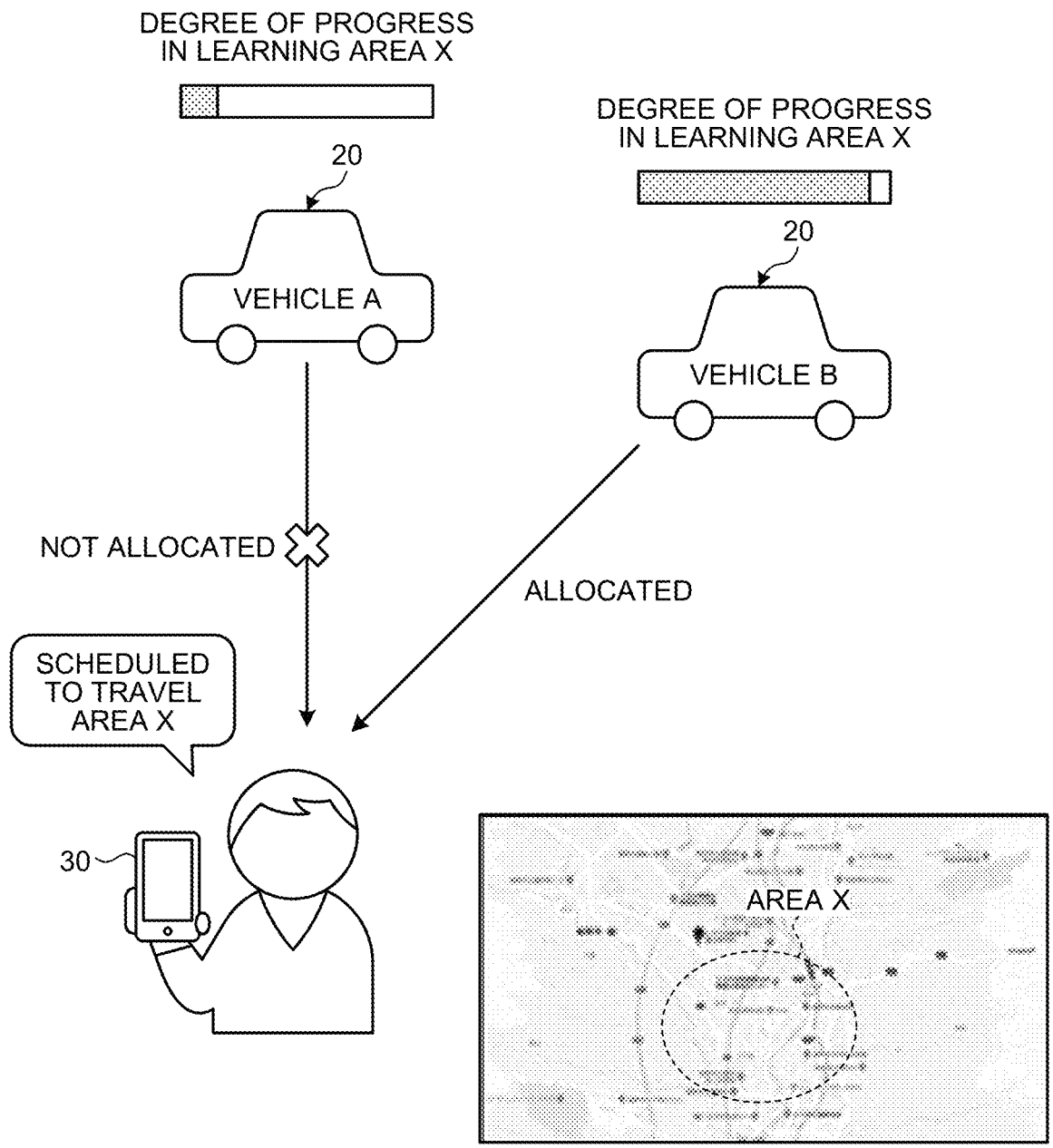
FIG. 4 outlines a vehicle allocation method executed by the vehicle allocation system according to the first embodiment.

For example, as illustrated in FIG. 4, when the user is scheduled to travel an area X, the vehicle selector 112 selects, for example, a vehicle B having the highest degree of progress in learning in the area X from a vehicle A and the vehicle B learning the area X during vehicle allocation. Then, the vehicle selector 112 outputs information on the selected vehicle B (hereinafter, referred to as "vehicle-to-be-allocated information") to the terminal 30 of the user, and outputs a vehicle allocation instruction to the selected vehicle B. Note that the "area" in the embodiment desirably has the size that at least causes difference in parameters (e.g., air temperature, humidity, air pressure, gradient, and altitude) collected by the vehicle 20.

Here, as described later, the user himself/herself selects the area to be traveled by the user through a vehicle allocation reservation screen (see FIG. 5) displayed on an operation/display unit 34 of the terminal 30. In the selection of the area to be traveled, for example, a municipality to be traveled by the vehicle 20 may be selected, or information, such as a postal code, with which the area can be identified may be input.

Furthermore, the degree of progress in learning is acquired from each vehicle 20. That is, the vehicle 20 calculates the degree of progress in learning based on the number of pieces of teacher data and acquisition timing thereof collected by the vehicle 20 itself. Then, when selecting the vehicle 20, the vehicle selector 112 acquires the degree of progress in learning from each vehicle 20, and selects the vehicle 20 based on the acquired degree of progress in learning. In such a way, the side of the vehicle allocation device 10 can grasp how much each vehicle 20 has progressed in learning by acquiring the degree of progress in learning from each vehicle 20.

The communicator 12 includes, for example, a local area network (LAN) interface board and a wireless communication circuit for wireless communication. The communicator 12 is connected to the network NW such as the Internet, which is a public communication network. Then, the communicator 12 is connected to the network NW to perform communication between the vehicle allocation device 10 and the vehicle 20 and the terminal 30.

The storage 13 includes a recording medium such as an erasable programmable ROM (EPROM), a hard disk drive (HDD), and a removable medium. Examples of the removable medium include disc recording media such as a universal serial bus (USB) memory, a compact disc (CD), a digital versatile disc (DVD), and a Blu-ray (registered trademark) disc (BD). The storage 13 can store, for example, an operating system (OS), various programs, various tables, and various databases.

The storage 13 includes an allocated-vehicle database (DB) 131. The allocated-vehicle DB 131 is built by a program of a database management system (DBMS) executed by the controller 11 managing data stored in the storage 13. The allocated-vehicle DB 131 includes, for example, a relational database in which a degree of progress in learning for each vehicle 20 is retrievably stored.

Furthermore, the storage 13 stores, for example, teacher data acquired from the vehicle 20 through the network NW and a learned model created by the learning unit 111 as needed in addition to the allocated-vehicle DB 131.

Vehicle

The vehicle 20 is a moving object capable of communicating with the outside, and is to be allocated to the user of the terminal 30 in response to a vehicle allocation request from the terminal 30. The vehicle 20 may be both a manually driven vehicle and an automatically driven vehicle.

Specifically, the vehicle 20 learns the relation between input and output of parameters depending on a predetermined area, and outputs the learning result to the vehicle allocation device 10. Note that, in the embodiment, "learning" performed at the vehicle 20 means collecting various parameters during traveling (during vehicle allocation) and creating teacher data. Then, the "learning result" output to the vehicle allocation device 10 specifically means the teacher data.

When a vehicle 20 has a relatively larger degree of progress in learning teacher data on an area to be traveled by the user than that of another vehicle 20 to be allocated, the vehicle 20 acquires a vehicle allocation instruction from the vehicle allocation device 10. Note that, when a vehicle 20 has the largest degree of progress in learning teacher data on an area to be traveled by the user as compared to another vehicle 20 to be allocated, the vehicle 20 may acquire a vehicle allocation instruction from the vehicle allocation device 10.

As illustrated in FIG. 2, the vehicle 20 includes a controller 21, a communicator 22, a storage 23, and a sensor group 24. The controller 21 is an electronic control unit (ECU) that comprehensively controls the operations of various components mounted on the vehicle 20. The controller 21 may include a processor and a memory (main storage). The processor includes, for example, a central processing unit (CPU), a digital signal processor (DSP), and a field-programmable gate array (FPGA). The memory includes, for example, a random access memory (RAM) and a read only memory (ROM). The controller 21 functions as a teacher data collector 211 and a degree-of-progress-in-learning calculator 212 through execution of a program stored in the storage 23.

The teacher data collector 211 collects teacher data depending on a predetermined area. Note that, in the embodiment, the "teacher data" indicates a set of an input parameter and an output parameter necessary for machine learning. In this way, the teacher data collector 211 collects teacher data for learning, and sequentially outputs the teacher data to the vehicle allocation device 10, whereby various parameters depending on a predetermined area can be learned.

Specifically, the teacher data collector 211 collects raw data of parameters with the sensor group 24 during traveling, and creates teacher data by performing predetermined pre-processing or the like on the raw data. Then, the teacher data collector 211 outputs the created teacher data to the vehicle allocation device 10 through the network NW.

The degree-of-progress-in-learning calculator 212 calculates a degree of progress in learning based on the number of pieces of teacher data and acquisition timing thereof collected by the vehicle 20. Then, the degree-of-progress-in-learning calculator 212 outputs the calculated degree of progress in learning to the vehicle allocation device 10 at predetermined time intervals. Specifically, the degree-of-progress-in-learning calculator 212 calculates the degree of progress in learning by Expression (1) below.

Degree of Progress in Learning=$A$×number of pieces of teacher data+$F$×average acquisition timing, where $A$: predetermined value, $F$: conversion coefficient (1)

Furthermore, for example, as illustrated in Table 1 below, the degree-of-progress-in-learning calculator 212 sets a conversion coefficient F in the Expression (1) above such that older (slower) average acquisition timing of teacher data causes a smaller (slower) degree of progress in learning. This allows calculation of the degree of progress in learning based on the freshness of the collected teacher data.

TABLE 1

| Vehicle | Number (of pieces) of teacher data | Average acquisition timing | Degree of progress in learning |
| --- | --- | --- | --- |
| Vehicle A | 1000 | 2019 Nov. 12 | 20 |
| Vehicle B | 700 | 2019 Dec. 12 | 90 |
| Vehicle C | 1600 | 2019 Oct. 3 | 0 |
| ... | ... | ... | ... |

The communicator 22 includes, for example, a data communication module (DCM), and performs communication between the vehicle 20 and the vehicle allocation device 10 and the terminal 30 by wireless communication via the network NW.

The storage 23 may include a recording medium such as an erasable programmable ROM (EPROM), a hard disk drive (HDD), and a removable medium. Examples of the removable medium include disc recording media such as a universal serial bus (USB) memory, a compact disc (CD), a digital versatile disc (DVD), and a Blu-ray (registered trademark) disc (BD). The storage 23 can store, for example, an operating system (OS), various programs, various tables, and various databases. The storage 23 stores, for example, raw data of parameters collected by the teacher data collector 211, teacher data created by the teacher data collector 211, and a degree of progress in learning calculated by the degree-of-progress-in-learning calculator 212 as needed.

The sensor group 24 detects and records parameters while the vehicle 20 is traveling. The sensor group 24 includes, for example, a vehicle speed sensor, an acceleration sensor, a GPS sensor, a traveling space sensor (3D-LiDAR), a millimeter wave sensor, a camera (imaging device), a temperature sensor, a humidity sensor, and air pressure sensor. The sensor group 24 outputs the raw data of the detected parameter to the teacher data collector 211.

Terminal

The terminal 30 is a terminal device for making a vehicle allocation request to the vehicle allocation device 10 based on a user operation. The terminal 30 is implemented by, for example, a smartphone, a mobile phone, a tablet terminal, and a wearable computer owned by the user of the vehicle 20. As illustrated in FIG. 2, the terminal 30 includes a controller 31, a communicator 32, a storage 33, and the operation/display unit 34. The controller 31 may include a processor and a memory (main storage). The processor includes, for example, a central processing unit (CPU), a digital signal processor (DSP), and a field-programmable gate array (FPGA). The memory includes, for example, a random access memory (RAM) and a read only memory (ROM). The controller 31 functions as a vehicle allocation reservation unit (vehicle allocation reservation circuit) 311 through execution of a program stored in the storage 33.

The vehicle allocation reservation unit 311 causes the operation/display unit 34 to display a vehicle allocation reservation screen, and receives a vehicle allocation reservation from a user through the vehicle allocation reservation screen. Subsequently, the vehicle allocation reservation unit 311 outputs a vehicle allocation request (vehicle allocation reservation information) to the vehicle allocation device 10 based on the vehicle allocation reservation. The vehicle allocation request includes, for example, a desired vehicle allocation time, an address of a place where a vehicle is to be allocated, an area to be traveled, a destination, and information for identifying a user (e.g., name and ID).

Subsequently, the vehicle allocation reservation unit 311 acquires information on the vehicle 20 from the vehicle allocation device 10 as the vehicle-to-be-allocated information. The vehicle 20 is selected from the plurality of vehicles 20 learning the relation between input and output of parameters depending on a predetermined area, and has a relatively large degree of progress in learning of the relation between input and output of parameters depending on an area to be traveled by the user. Then, the vehicle allocation reservation unit 311 causes the operation/display unit 34 to display the vehicle-to-be-allocated information. Note that the vehicle allocation reservation unit 311 may acquire information on the vehicle 20 having the largest degree of progress in learning the relation between input and output of parameters depending on the area to be traveled by the user from the vehicle allocation device 10 as the vehicle-to-be-allocated information.

Figure 5:
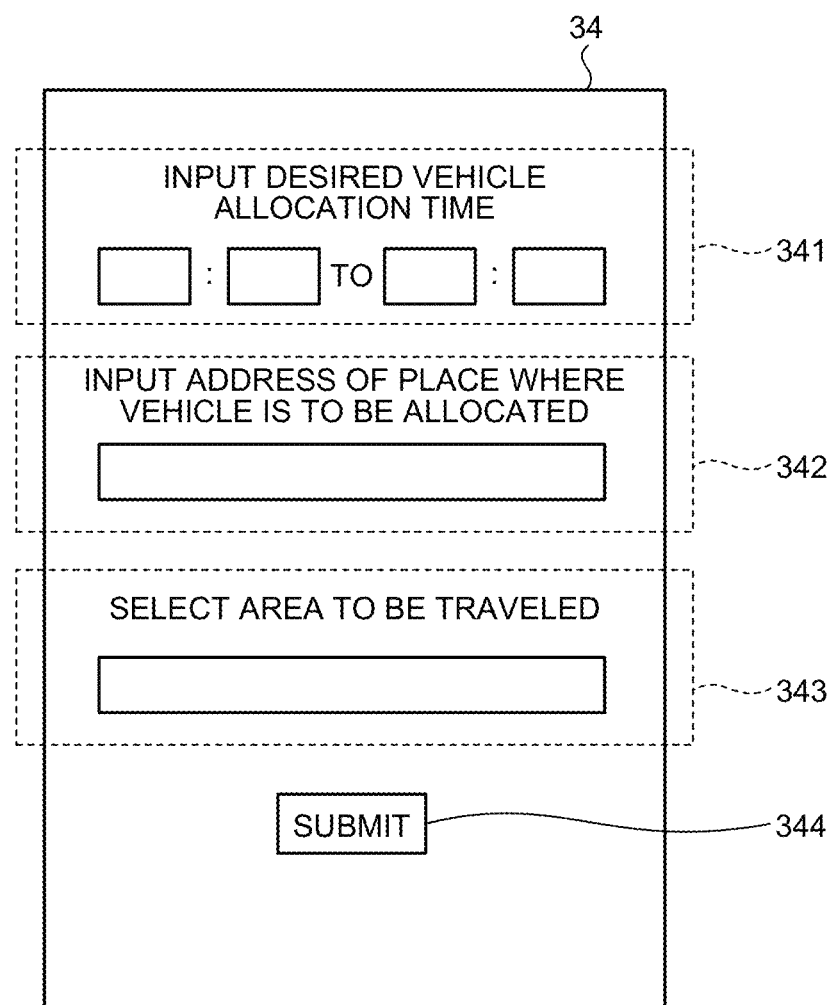
FIG. 5 illustrates one example of a vehicle allocation reservation screen displayed on a terminal in the vehicle allocation method executed by the vehicle allocation system according to the first embodiment.

When making a vehicle allocation reservation, the vehicle allocation reservation unit 311 causes the operation/display unit 34 to display, for example, a vehicle allocation reservation screen as illustrated in FIG. 5. The vehicle allocation reservation screen is displayed by, for example, a user tapping an icon of a vehicle allocation application displayed on the operation/display unit 34 and activating the vehicle allocation application. An input field for a desired vehicle allocation time, an input field for an address of a place where a vehicle is to be allocated, an input field for an area to be traveled, and a submit button 344 are displayed in an area 341, an area 342, an area 343, and a bottom line, respectively, on the vehicle allocation reservation screen in the figure. Note that, in addition to the items illustrated in the figure, the vehicle allocation reservation unit 311 may display an input field for information for identifying, for example, a destination and a user (e.g., name and ID).

When the user inputs all items on the vehicle allocation reservation screen and presses the submit button 344, the vehicle allocation reservation unit 311 outputs a vehicle allocation request including information input to these items to the vehicle allocation device 10.

Figure 6:
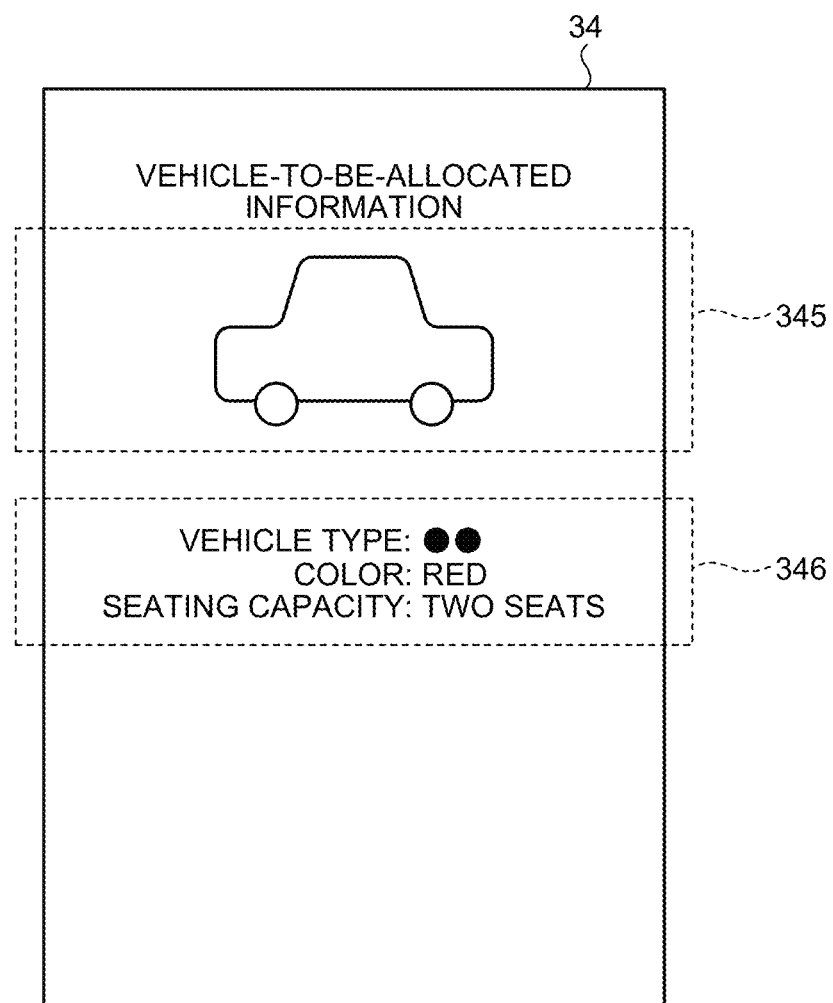
FIG. 6 illustrates one example of vehicle-to-be-allocated information displayed on a terminal in the vehicle allocation method executed by the vehicle allocation system according to the first embodiment.

The vehicle selector 112 of the vehicle allocation device 10 that has acquired the vehicle allocation request selects a vehicle to be allocated with reference to the allocated-vehicle DB 131, and causes the operation/display unit 34 to display, for example, vehicle-to-be-allocated information as illustrated in FIG. 6. An image of a vehicle to be allocated and a vehicle type, color, and a seating capacity are displayed in an area 345 and an area 346, respectively, as the vehicle-to-be-allocated information illustrated in the figure.

The communicator 32 may include, for example, a local area network (LAN) interface board and a wireless communication circuit for wireless communication. The communicator 32 is connected to the network NW such as the Internet, which is a public communication network. The communicator 32 performs communication between the terminal 30 and the vehicle allocation device 10 and the vehicle 20 by wireless communication via the network NW.

The storage 33 may include a recording medium such as an erasable programmable ROM (EPROM), a hard disk drive (HDD), and a removable medium. Examples of the removable medium include disc recording media such as a universal serial bus (USB) memory, a compact disc (CD), a digital versatile disc (DVD), and a Blu-ray (registered trademark) disc (BD). The storage 33 can store, for example, an operating system (OS), various programs, various tables, and various databases. The storage 33 stores, for example, an application program (vehicle allocation application) for implementing the vehicle allocation reservation unit 311.

The operation/display unit 34 includes, for example, a touch panel display. The operation/display unit 34 has an input function and a display function. The input function is used for receiving an operation with, for example, a finger of a passenger in the vehicle 20 or a pen. The display function is used for displaying various pieces of information under the control of the controller 31. The operation/display unit 34 displays a vehicle allocation reservation screen (see FIG. 5) and a vehicle-to-be-allocated information (see FIG. 6) under the control of the vehicle allocation reservation unit 311.

Vehicle Allocation Method

Figure 7:
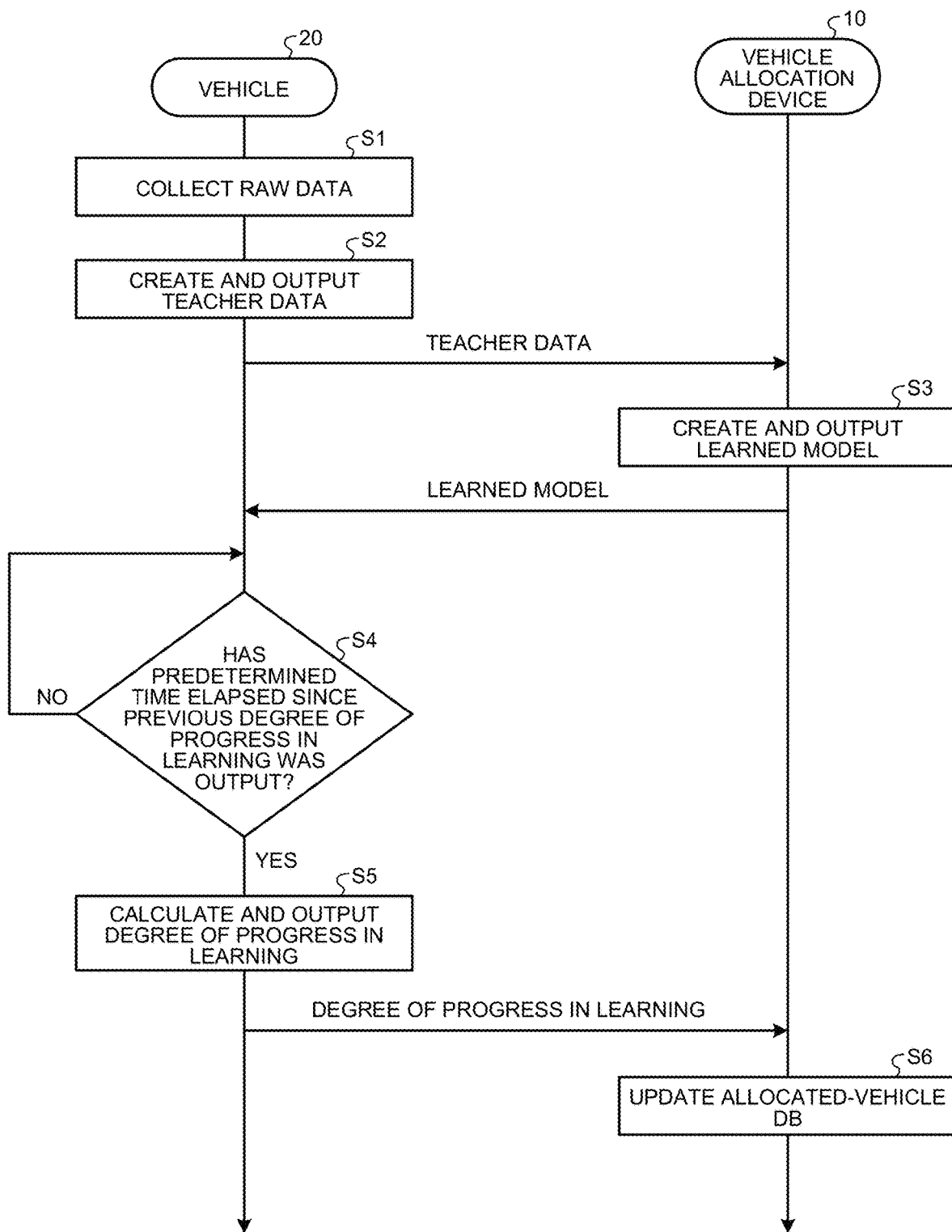
FIG. 7 is a flowchart illustrating a flow of collecting and learning teacher data in the vehicle allocation method executed by the vehicle allocation system according to the first embodiment.
Figure 8:
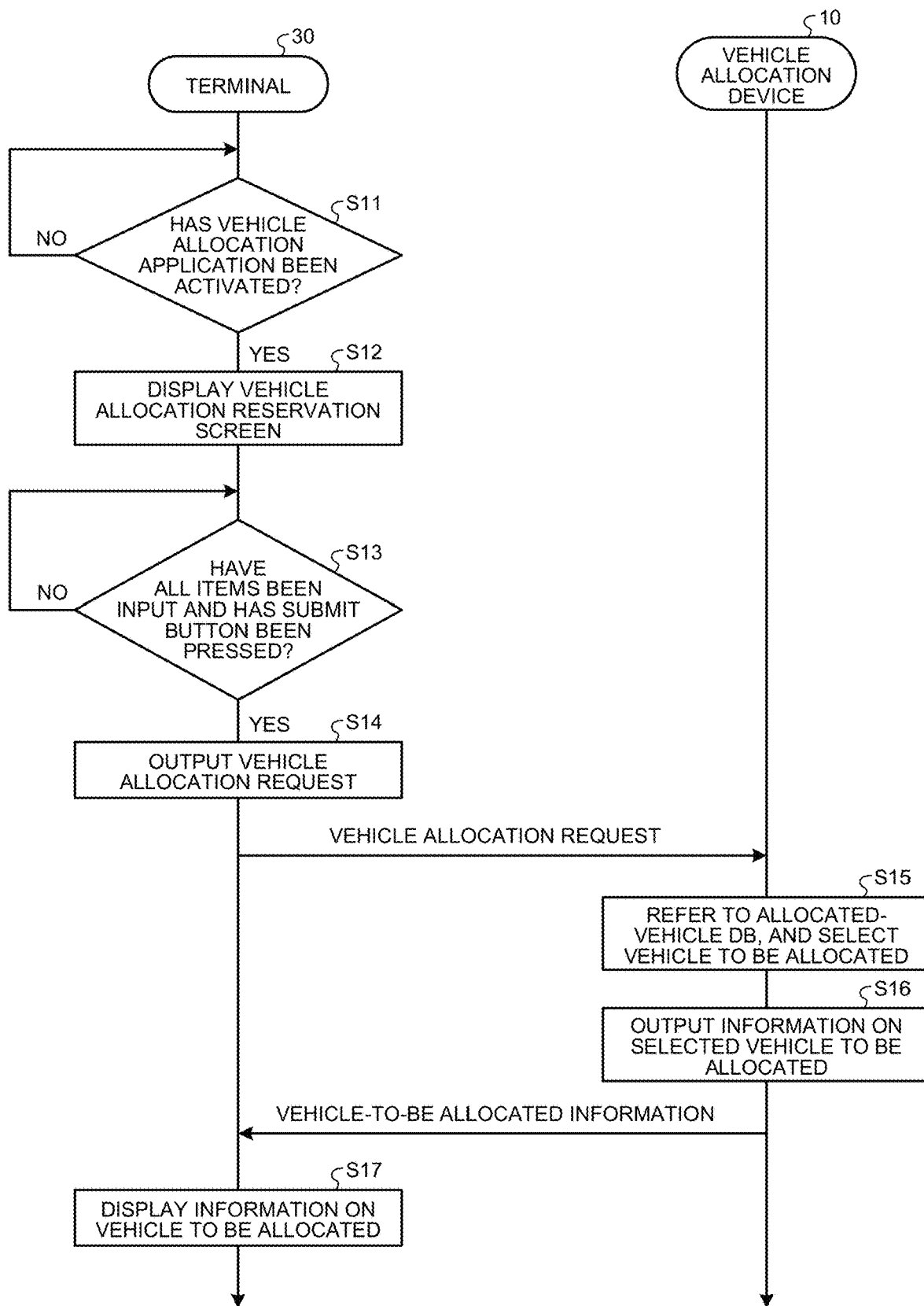
FIG. 8 is a flowchart illustrating a flow of a vehicle allocation reservation in the vehicle allocation method executed by the vehicle allocation system according to the first embodiment.

One example of processing procedures of a vehicle allocation method executed by the vehicle allocation system 1 according to the embodiment will be described with reference to FIGS. 7 and 8. In the following, FIG. 7 illustrates the flow of a step of collecting and learning teacher data with the vehicle 20 (hereinafter, referred to as a "learning step") in the vehicle allocation system 1, and FIG. 8 illustrates the flow of a step of making a vehicle allocation reservation (hereinafter, referred to as a "vehicle allocation reservation step") in the vehicle allocation system 1. Furthermore, in the following vehicle allocation reservation step, an example in which the vehicle 20 having the highest degree of progress in learning is preferentially allocated will be described.

Learning Step

First, the teacher data collector 211 of the vehicle 20 collects raw data of parameters in a predetermined area through the sensor group 24 (Step S1). Subsequently, the teacher data collector 211 creates teacher data from the raw data, and outputs the created teacher data to the vehicle allocation device 10 (Step S2). Subsequently, the learning unit 111 of the vehicle allocation device 10 creates a learned model by performing machine learning on the teacher data, and outputs the created learned model to the vehicle 20 (Step S3).

Subsequently, the degree-of-progress-in-learning calculator 212 of the vehicle 20 determines whether or not a predetermined time has elapsed since the previous degree of progress in learning was output to the vehicle allocation device 10 (Step S4). When determining that the predetermined time has elapsed since the previous degree of progress in learning was output to the vehicle allocation device 10 (Yes in Step S4), the degree-of-progress-in-learning calculator 212 calculates a degree of progress in learning based on Expression (1) above, and outputs the calculated degree of progress in learning to the vehicle allocation device 10 (Step S5). In response, the controller 11 of the vehicle allocation device 10 updates the allocated-vehicle DB 131 by storing the degree of progress in learning in the allocated-vehicle DB 131 (Step S6). Note that, when determining that the predetermined time has not elapsed since the previous degree of progress in learning was output to the vehicle allocation device 10 (No in Step S4), the degree-of-progress-in-learning calculator 212 returns to Step S4. With the above, the processing of the learning step of the vehicle allocation method ends.

Vehicle Allocation Reservation Step

First, the vehicle allocation reservation unit 311 of the terminal 30 determines whether or not a user has tapped an icon of a vehicle allocation application displayed on the operation/display unit 34 and has activated the vehicle allocation application (Step S11). When determining that the vehicle allocation application has been activated (Yes in Step S11), the vehicle allocation reservation unit 311 causes the operation/display unit 34 to display the vehicle allocation reservation screen (see FIG. 5) (Step S12). Note that, when determining that the vehicle allocation application has not been activated (No in Step S11), the vehicle allocation reservation unit 311 returns to Step S11.

Subsequently, the vehicle allocation reservation unit 311 determines whether or not all items on the vehicle allocation reservation screen have been input and the submit button 344 has been pressed (Step S13). When determining that all items on the vehicle allocation reservation screen have been input and the submit button 344 has been pressed (Yes in Step S13), the vehicle allocation reservation unit 311 outputs a vehicle allocation request to the vehicle allocation device 10 (Step S14). Note that, when determining that either of the items on the vehicle allocation reservation screen has not been input or the submit button 344 has not been pressed (No in Step S13), the vehicle allocation reservation unit 311 returns to Step S13.

Subsequently, the vehicle selector 112 of the vehicle allocation device 10 refers to the allocated-vehicle DB 131, and selects a vehicle to be allocated (Step S15). In Step S15, the vehicle selector 112 selects a vehicle 20 having the largest degree of progress in learning of the relation between input and output of parameters depending on an area to be traveled by the user from a plurality of vehicles 20 learning the relation between input and output of parameters depending on a predetermined area. That is, the vehicle selector 112 first narrows down the vehicle 20 that has learned the relation between input and output of parameters depending on an area to be traveled, included in a vehicle allocation request, from the plurality of vehicles 20. Then, the vehicle selector 112 refers to the allocated-vehicle DB 131, and selects the vehicle 20 having the largest value of the degree of progress in learning among the vehicles 20 that has been narrowed down as a vehicle to be allocated.

Subsequently, the vehicle selector 112 outputs information on the selected vehicle to be allocated to the terminal 30 (Step S16). In response, the vehicle allocation reservation unit 311 causes the operation/display unit 34 to display the vehicle-to-be-allocated information (see FIG. 6) (Step S17). Note that, in Step S16, the vehicle selector 112 outputs the vehicle-to-be-allocated information to the terminal 30, and also outputs a vehicle allocation instruction to the selected vehicle 20. With the above, the processing of the vehicle allocation reservation step of the vehicle allocation method ends.

According to the vehicle allocation device 10, the vehicle 20, and the terminal 30 according to the above-described first embodiment, a vehicle 20 progressing ahead in learning teacher data of an area to be traveled, that is, the vehicle 20 mounted with a learned model with high accuracy among vehicles 20 to be allocated is preferentially allocated, which improves advantages in use for a user.

When a vehicle performing AI learning is allocated, the learning situation differs between vehicles to be allocated, so that learning may be extremely delayed depending on a vehicle. If such a vehicle is allocated, unfairness occurs between users who borrow a vehicle. In contrast, according to the vehicle allocation device 10, the vehicle 20, and the terminal 30 according to the first embodiment, whether or not learning is progressed is determined based on the number of pieces of teacher data and acquisition timing of the teacher data (freshness of teacher data), and a vehicle 20 progressing ahead in learning is preferentially allocated, which improves advantages in use for a user.

Second Embodiment

Figure 9:
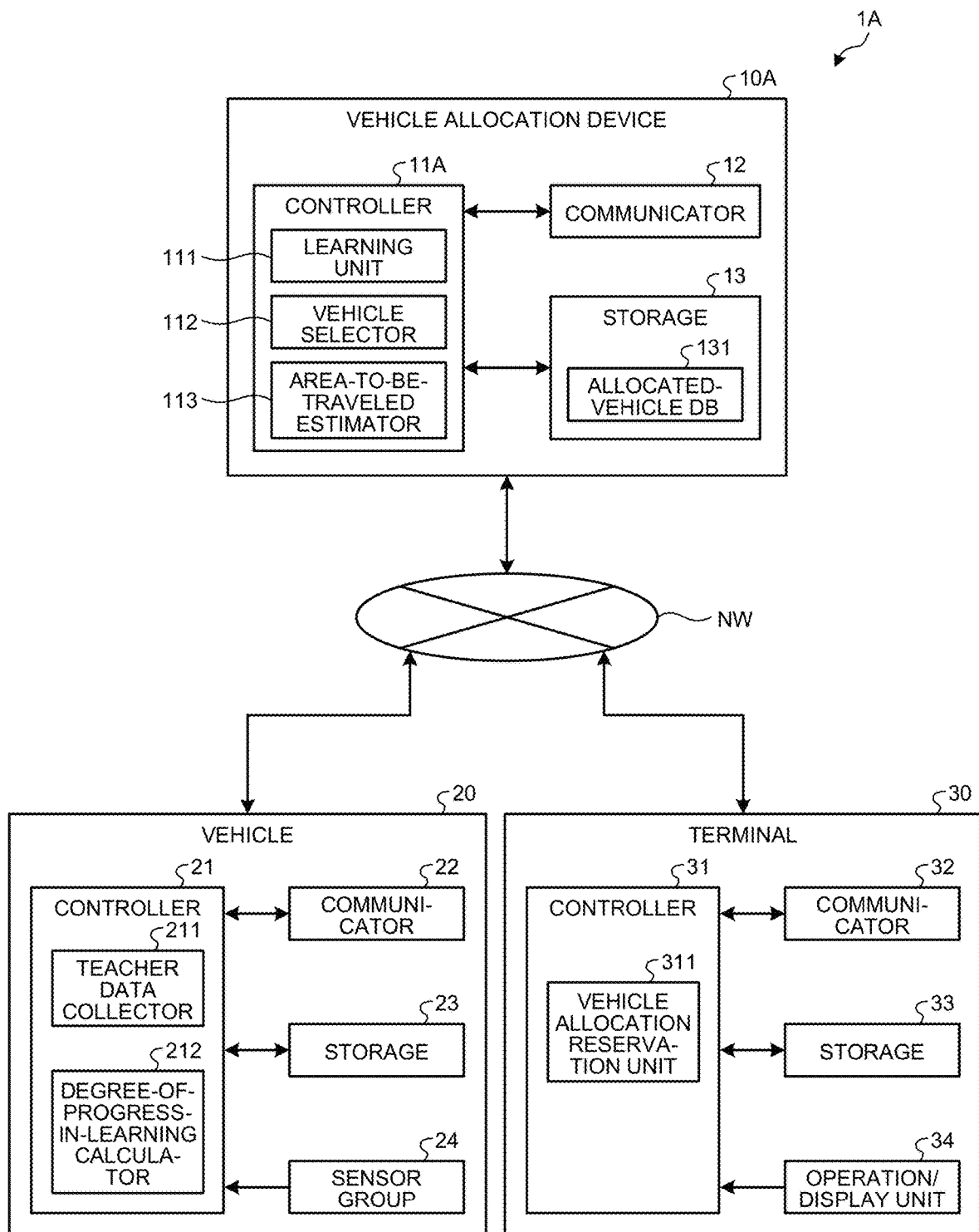
FIG. 9 is a block diagram schematically illustrating each configuration of a vehicle allocation system according to a second embodiment.

A vehicle allocation system according to a second embodiment of the disclosure will be described with reference to FIGS. 9 and 10. As illustrated in FIG. 9, a vehicle allocation system 1A according to the embodiment includes a vehicle allocation device 10A, the vehicle 20, and the terminal 30. All of the vehicle allocation device 10A, the vehicle 20, and the terminal 30 have a communication function, and can communicate with each other through the network NW. In the following, the description of a configuration similar to that of the above-described vehicle allocation system 1 (see FIG. 2) will be omitted.

Vehicle Allocation Device

As illustrated in FIG. 9, the vehicle allocation device 10A includes a controller 11A, the communicator 12, and the storage 13. The controller 11A functions as an area-to-be-traveled estimator 113 in addition to the learning unit 111 and the vehicle selector 112.

The area-to-be-traveled estimator 113 estimates an area to be traveled by the vehicle 20 based on information on a destination included in a vehicle allocation request. Note that the area to be traveled may be estimated in consideration of information other than the destination. For example, an area which a user often passes through at the time when the user travels to the destination included in a vehicle allocation request may be estimated as the area to be traveled. The "area which a user often passes through" at the case may be preliminarily collected as user information, and stored in the storage 13. Estimating an area to be traveled by the vehicle 20 with the area-to-be-traveled estimator 113 in this way eliminates the need for the user himself/herself to specify an area to be traveled at the time of vehicle allocation, which saves the user efforts.

Vehicle Allocation Method

One example of processing procedures of a vehicle allocation method executed by the vehicle allocation system 1A according to the embodiment will be described with reference to FIG. 10. Note that, in the vehicle allocation system 1A, the flow of the learning step is similar to that in the first embodiment (see FIG. 7). The flow of the vehicle allocation reservation step will be described below. Furthermore, in the following vehicle allocation reservation step, an example in which the vehicle 20 having the highest degree of progress in learning is selected and allocated will be described.

Vehicle Allocation Reservation Step First, the vehicle allocation reservation unit 311 of the terminal 30 determines whether or not a user has tapped an icon of a vehicle allocation application displayed on the operation/display unit 34 and has activated the vehicle allocation application (Step S21). When determining that the vehicle allocation application has been activated (Yes in Step S21), the vehicle allocation reservation unit 311 causes the operation/display unit 34 to display the vehicle allocation reservation screen (see FIG. 5) (Step S22). Note that, when determining that the vehicle allocation application has not been activated (No in Step S21), the vehicle allocation reservation unit 311 returns to Step S21.

Subsequently, the vehicle allocation reservation unit 311 determines whether or not all items on the vehicle allocation reservation screen have been input and the submit button 344 has been pressed (Step S23). When determining that all items on the vehicle allocation reservation screen have been input and the submit button 344 has been pressed (Yes in Step S23), the vehicle allocation reservation unit 311 outputs a vehicle allocation request to the vehicle allocation device 10A (Step S24). Note that, when determining that either of the items on the vehicle allocation reservation screen has not been input or the submit button 344 has not been pressed (No in Step S23), the vehicle allocation reservation unit 311 returns to Step S23.

Subsequently, the area-to-be-traveled estimator 113 of the vehicle allocation device 10A estimates an area to be traveled by the vehicle 20 based on information on a destination included in a vehicle allocation request (Step S25). Subsequently, the vehicle selector 112 refers to the allocated-vehicle DB 131, and selects a vehicle to be allocated (Step S26). In Step S26, the vehicle selector 112 first narrows down the vehicle 20 learning the relation between input and output of parameters depending on an area to be traveled, estimated in Step S25, from the plurality of vehicles 20. Then, the vehicle selector 112 refers to the allocated-vehicle DB 131, and selects the vehicle 20 having the largest value of the degree of progress in learning among the vehicles 20 that has been narrowed down as a vehicle to be allocated.

Subsequently, the vehicle selector 112 outputs information on the selected vehicle to be allocated to the terminal 30 (Step S27). In response, the vehicle allocation reservation unit 311 causes the operation/display unit 34 to display the vehicle-to-be-allocated information (see FIG. 6) (Step S28). Note that, in Step S27, the vehicle selector 112 outputs the vehicle-to-be-allocated information to the terminal 30, and also outputs a vehicle allocation instruction to the selected vehicle 20. With the above, the processing of the vehicle allocation reservation step of the vehicle allocation method ends.

According to the vehicle allocation device 10A, the vehicle 20, and the terminal 30 according to the above-described second embodiment, a vehicle 20 progressing ahead in learning teacher data of an area to be traveled, that is, the vehicle 20 mounted with a learned model with high accuracy is preferentially allocated, which improves advantages in use for a user.

Additional effects and variations can be easily derived by those skilled in the art. Accordingly, the broader aspects of the disclosure are not limited to the particular details and representative embodiments illustrated and described above. Consequently, various modifications can be made without departing from the spirit or scope of the general inventive concept defined by the appended claims and equivalents thereof.

For example, although, in the above-described vehicle allocation reservation steps (see FIGS. 8 and 10) of the vehicle allocation systems 1 and 1A, a case where the vehicle 20 having the highest degree of progress in learning is selected and allocated has been described, the vehicle 20 may be selected in accordance with another condition from vehicles 29 having a predetermined degree or more of progress in learning. Alternatively, whether allocation is possible or not may be determined in order from the vehicle 20 having the highest degree of progress in learning, and a vehicle 20 that has first been determined as possible may be selected.

Furthermore, although, in the above-described vehicle allocation systems 1 and 1A, raw data is collected and teacher data is created on the side of the vehicle 20, and teacher data is learned and learned data is created on the sides of the vehicle allocation devices 10 and 10A, a subject that creates the teacher data and a subject of learning are not limited to these systems and devices.

In the vehicle allocation systems 1 and 1A, for example, raw data may be collected on the side of the vehicle 20, and teacher data may be created, teacher data may be learned, and learned data may be created on the sides of the vehicle allocation devices 10 and 10A. Furthermore, raw data may be collected, teacher data may be created, teacher data may be learned, and learned data may be created on the side of the vehicle 20.

Furthermore, although, in the vehicle allocation systems 1 and 1A, the teacher data collector 211 of the vehicle 20 collects various parameters, various parameters may be acquired and used by, for example, road-to-vehicle communication and vehicle-to-vehicle communication.

Furthermore, although, in the vehicle allocation systems 1 and 1A, a degree of progress in learning is calculated based on the number of pieces of teacher data and an average acquisition timing thereof as illustrated in Expression (1) above, a median of pieces of acquisition timing of teacher data, the oldest acquisition timing of teacher data, and the latest acquisition timing of teacher data may be used instead of the average acquisition timing of teacher data.

Furthermore, although the above-described vehicle allocation systems 1 and 1A are described assuming a scene in which a vehicle is allocated to a user on a common public road, the vehicle allocation systems 1 and 1A can be applied to vehicle allocation service using automatically driven vehicles in, for example, a connected city in which all goods and services are connected by information.

According to the disclosure, a vehicle progressing ahead in learning teacher data of an area to be traveled, that is, the vehicle mounted with a learned model with high accuracy is preferentially allocated, which improves advantages in use for a user.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle allocation device for allocating a vehicle in response to a vehicle allocation request from a terminal of a user, the vehicle allocation device comprising
    a vehicle selector configured to, when acquiring the vehicle allocation request, select a vehicle having a relatively large degree of progress in learning of a relation between input and output of a parameter depending on an area to be traveled by the user from a plurality of vehicles learning a relation between input and output of a parameter depending on a predetermined area, and output a vehicle allocation instruction to the selected vehicle,
    wherein the parameter depending on the predetermined area includes air temperature, humidity, air pressure, gradient, altitude, engine intake air amount, engine ignition timing, and engine exhaust temperature.

2. The vehicle allocation device according to claim 1, wherein
    the vehicle selector is configured to select the vehicle having a largest degree of progress in learning of the relation between input and output of the parameter depending on the area to be traveled by the user from the plurality of vehicles, and output the vehicle allocation instruction to the selected vehicle having the largest degree of progress in learning of the relation between input and output of the parameter depending on the area to be traveled by the user.

3. The vehicle allocation device according to claim 1, further comprising an area-to-be-traveled estimator configured to estimate the area to be traveled based on a destination included in the vehicle allocation request.

4. The vehicle allocation device according to claim 1, further comprising a learning circuit configured to learn a parameter collected by each of the plurality of vehicles as teacher data.

5. The vehicle allocation device according to claim 4, wherein the vehicle selector is configured to acquire the degree of progress in learning calculated based on a number of pieces of the teacher data from each vehicle.

6. A vehicle to be allocated by a vehicle allocation device in response to a vehicle allocation request from a terminal of a user, the vehicle comprising
    a controller configured to:
        learn a relation between input and output of a parameter depending on a predetermined area; and acquire a vehicle allocation instruction from the vehicle allocation device when a degree of progress in learning of a relation between input and output of a parameter depending on an area to be traveled by the user is relatively larger than that of another vehicle to be allocated, wherein the parameter depending on the predetermined area includes air temperature, humidity, air pressure, gradient, altitude, engine intake air amount, engine ignition timing, and engine exhaust temperature.

7. The vehicle according to claim 6, wherein the controller is configured to acquire the vehicle allocation instruction from the vehicle allocation device when the degree of progress in learning of the relation between input and output of the parameter depending on the area to be traveled by the user is largest among vehicles to be allocated.

8. The vehicle according to claim 6, wherein the controller includes:
- a teacher data collector configured to collect teacher data including an input parameter and an output parameter depending on a predetermined area; and
- a degree-of-progress-in-learning calculator configured to calculate the degree of progress in learning based on a number of pieces of the teacher data, and output the calculated degree of progress in learning to the vehicle allocation device.

9. A terminal that makes a vehicle allocation request to a vehicle allocation device, the terminal comprising a vehicle allocation reservation circuit configured to receive a vehicle allocation reservation from a user, and output a vehicle allocation request to the vehicle allocation device based on the received vehicle allocation reservation, wherein the vehicle allocation reservation circuit is configured to acquire information on a vehicle as vehicle-to-be-allocated information by outputting a vehicle allocation request to the vehicle allocation device, the vehicle being selected from a plurality of vehicles learning a relation between input and output of a parameter depending on a predetermined area, the vehicle having a relatively large degree of progress in learning of a relation between input and output of a parameter depending on an area to be traveled by the user, wherein the parameter depending on the predetermined area includes air temperature, humidity, air pressure, gradient, altitude, engine intake air amount, engine ignition timing, and engine exhaust temperature.

10. The terminal according to claim 9, wherein
the vehicle-to-be-allocated information is information on the vehicle having a largest degree of progress in learning of the relation between input and output of the parameter depending on the area to be traveled by the user.

\* \* \* \* \*